(12) United States Patent
Choi et al.

(10) Patent No.: US 10,878,266 B2
(45) Date of Patent: *Dec. 29, 2020

(54) VEHICLE AND METHOD FOR CONTROLLING THE SAME

(71) Applicant: MANDO CORPORATION, Pyeongtaek-si (KR)

(72) Inventors: Seong Ho Choi, Anyang-si (KR); Seung Hyun Roh, Seongnam-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/281,840

(22) Filed: Feb. 21, 2019

(65) Prior Publication Data

US 2020/0074208 A1    Mar. 5, 2020

(30) Foreign Application Priority Data

Aug. 28, 2018  (KR) .................. 10-2018-0101583

(51) Int. Cl.

| | |
|---|---|
| *G06K 9/32* | (2006.01) |
| *G06F 16/587* | (2019.01) |
| *G06K 9/00* | (2006.01) |
| *G06T 7/50* | (2017.01) |
| *B60W 30/095* | (2012.01) |
| *B60W 30/12* | (2020.01) |

(52) U.S. Cl.

CPC ......... *G06K 9/3233* (2013.01); *G06F 16/587* (2019.01); *G06K 9/00798* (2013.01); *G06T 7/50* (2017.01); *B60W 30/095* (2013.01); *B60W 30/12* (2013.01); *G06T 2207/30261* (2013.01)

(58) Field of Classification Search

CPC ........... G06K 9/00798; G06K 9/00805; G06K 9/3233; G06T 7/50; G06T 2207/30261; G06F 16/587; B60W 30/095; B60W 30/12; B60Q 9/008; B60K 35/00

See application file for complete search history.

(56) References Cited

U.S. PATENT DOCUMENTS

| | | | |
|---|---|---|---|
| 2008/0088707 A1* | 4/2008 | Iwaki .................... | G01S 13/867 348/208.1 |
| 2010/0214791 A1* | 8/2010 | Schofield ............. | B60Q 1/1423 362/466 |

(Continued)

*Primary Examiner* — Katrina R Fujita
(74) *Attorney, Agent, or Firm* — Morgan, Lewis & Bockius LLP

(57) ABSTRACT

A vehicle and a method for controlling the same are disclosed, which determine a region of interest (ROI) in a forward-view image based on braking information and steering information of the vehicle, and obtain driving assistance information from the ROI image. The vehicle includes an image acquisition part configured to acquire a forward-view image by capturing an image about a forward region of a vehicle, a steering information acquisition part configured to acquire steering information by detecting a steering direction and a steering angle of the vehicle, a braking information acquisition part configured to acquire braking information by detecting a braking or non-braking state and a braking deceleration of the vehicle, and a controller configured to determine a region of interest (ROI) within the forward-view image based on at least one of the steering information and the braking information of the vehicle.

18 Claims, 11 Drawing Sheets

(56) References Cited

U.S. PATENT DOCUMENTS

| | | | |
|---|---|---|---|
| 2011/0013839 A1* | 1/2011 | Hue | G01N 21/538 |
| | | | 382/173 |
| 2019/0092235 A1* | 3/2019 | Kim | G06T 7/11 |
| 2020/0001879 A1* | 1/2020 | Pietzsch | B60W 40/04 |

* cited by examiner

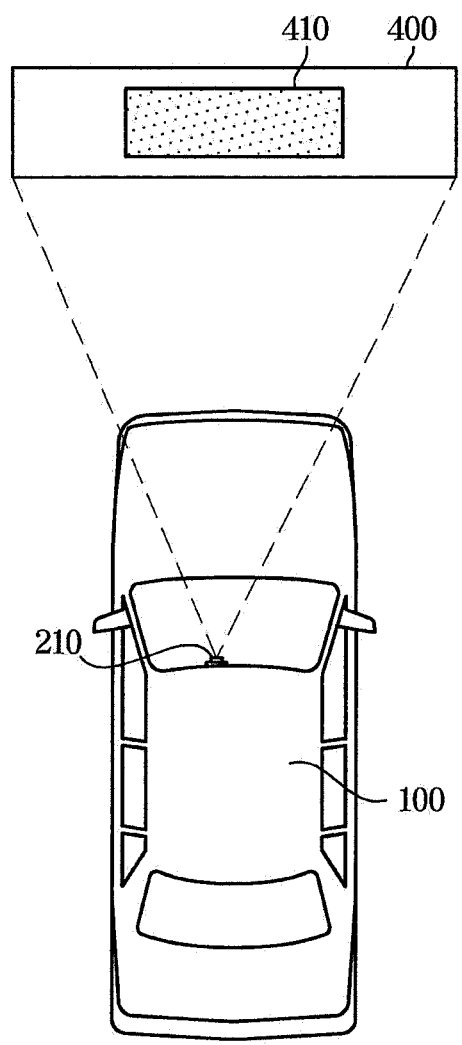

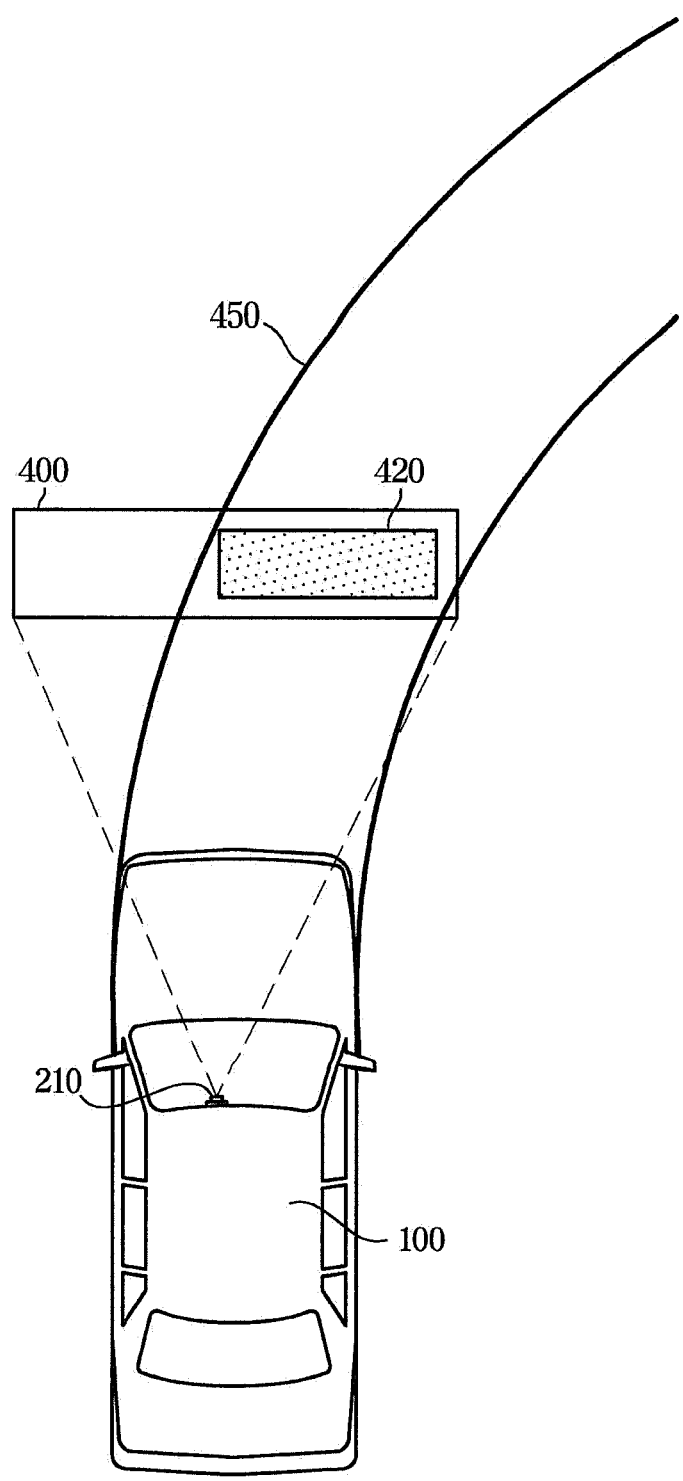

VEHICLE AND METHOD FOR CONTROLLING THE SAME

CROSS-REFERENCE TO RELATED APPLICATION

This application is based on and claims priority under 35 U.S.C. § 119 to Korean Patent Application No. 10-2018-0101583, filed on Aug. 28, 2018 in the Korean Intellectual Property Office, the disclosure of which is incorporated by reference in its entirety.

BACKGROUND

1. Field

Embodiments of the present disclosure relate to a vehicle and a method for controlling the same, and more particularly to a vehicle for determining a region of interest (ROI) in a forward-view image acquired by a camera mounted to the vehicle, and a method for controlling the same.

2. Description of the Related Art

In recent times, as the number of vehicles is rapidly increasing in modern society, the number of traffic accidents between vehicles is also rapidly increasing. In order to reduce the number of traffic accidents, a Forward Collision Warning (FCW) system, a Lane Departure Warning System (LDWS), etc. have recently been embedded in many vehicles.

The Forward Collision Warning (FCW) system, the Lane Departure Warning System (LDWS), etc. may receive images collected by a camera, and may generate information by determining a necessary ROI in the received camera images.

As camera performances are becoming increasingly improved, it may take much more time to process the collected images, such that it may be difficult to generate necessary information in real time.

In addition, the ROI may be set to an unnecessary region according to driving states of a vehicle, such that unnecessary image processing may occur, resulting in reduction in driving safety and stability of the vehicle.

In order to address the above-mentioned issues, there is a need to dynamically adjust the ROI according to driving states of the vehicle.

SUMMARY

Therefore, it is an aspect of the present disclosure to provide a vehicle and a method for controlling the same, which may determine a region of interest (ROI) in a forward-view image based on braking information and steering information of the vehicle, and may acquire driving assistance information from the ROI image.

Additional aspects of the disclosure will be set forth in part in the description which follows and, in part, will be obvious from the description, or may be learned by practice of the disclosure.

In accordance with an aspect of the present disclosure, a vehicle includes an image acquisition part configured to acquire a forward-view image by capturing an image about a forward region of a vehicle, a steering information acquisition part configured to acquire steering information by detecting a steering direction and a steering angle of the vehicle, a braking information acquisition part configured to acquire braking information by detecting a braking or non-braking state and a braking deceleration of the vehicle, and a controller configured to determine a region of interest (ROI) within the forward-view image based on at least one of the steering information and the braking information of the vehicle.

The controller may initially determine a predetermined region centering around a center point of the forward-view image within the forward-view image to be a region of interest (ROI), and may coordinate the region of interest (ROI) based on at least one of the steering information and the braking information.

The controller may move a position of the region of interest (ROI) in the same direction as the steering direction of the vehicle based on the steering information.

The controller may move a position of the region of interest (ROI) in proportion to the steering angle of the vehicle based on the steering information.

The controller may move a boundary of the region of interest (ROI) in a direction opposite to the steering direction of the vehicle in the same direction as the steering direction of the vehicle based on the steering information, and may thus reduce a size of the region of interest (ROI).

The controller may move a boundary of the region of interest (ROI) in a direction opposite to the steering direction of the vehicle in the same direction as the steering direction of the vehicle in proportion to the steering angle of the vehicle based on the steering information, and may thus reduce a size of the region of interest (ROI).

The controller may move a position of the region of interest (ROI) in an upward direction from a center point of the forward-view image based on the braking information.

The controller may move a position of the region of interest (ROI) in an upward direction from a center point of the forward-view image in proportion to a braking deceleration of the vehicle based on the braking information.

The controller may acquire driving assistance information from an image of the region of interest (ROI).

The driving assistance information may be at least one of lane departure information, information about a distance between the vehicle and an object, and information about whether there is a high possibility of collision between the vehicle and the object.

In accordance with another aspect of the present disclosure, a method for controlling a vehicle includes acquiring a forward-view image by capturing an image about a forward region of a vehicle, acquiring steering information by detecting a steering direction and a steering angle of the vehicle, acquiring braking information by detecting a braking or non-braking state and a braking deceleration of the vehicle, determining a predetermined region centering around a center point of the forward-view image within the forward-view image to be a region of interest (ROI), and coordinating a region of interest (ROI) within the forward-view image based on at least one of the steering information and the braking information of the vehicle.

The determining the region of interest (ROI) may include initially determining the predetermined region centering around the center point of the forward-view image within the forward-view image to be the region of interest (ROI), and coordinating the region of interest (ROI) based on at least one of the steering information and the braking information.

The determining the region of interest (ROI) may include moving a position of the region of interest (ROI) in the same direction as the steering direction of the vehicle based on the steering information.

The determining the region of interest (ROI) may include moving a position of the region of interest (ROI) in proportion to the steering angle of the vehicle based on the steering information.

The determining the region of interest (ROI) may include moving a boundary of the region of interest (ROI) in a direction opposite to the steering direction of the vehicle in the same direction as the steering direction of the vehicle, and thus reducing a size of the region of interest (ROI).

The coordinating the region of interest (ROI) may include moving a boundary of the region of interest (ROI) in a direction opposite to the steering direction of the vehicle in the same direction as the steering direction of the vehicle in proportion to the steering angle of the vehicle based on the steering information, and thus reducing a size of the region of interest (ROI).

The coordinating the region of interest (ROI) may include moving a position of the region of interest (ROI) in an upward direction from the center point of the forward-view image based on the braking information.

The coordinating the region of interest (ROI) may include moving a position of the region of interest (ROI) in an upward direction from the center point of the forward-view image in proportion to a braking deceleration of the vehicle based on the braking information.

The method may further include acquiring driving assistance information from an image of the region of interest (ROI).

The driving assistance information may be at least one of lane departure information, information about a distance between the vehicle and an object, and information about whether there is a high possibility of collision between the vehicle and the object.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 4A and 4B are conceptual diagrams illustrating examples for adjusting an ROI based on steering information according to an embodiment of the present disclosure.

DETAILED DESCRIPTION

Figure 1:
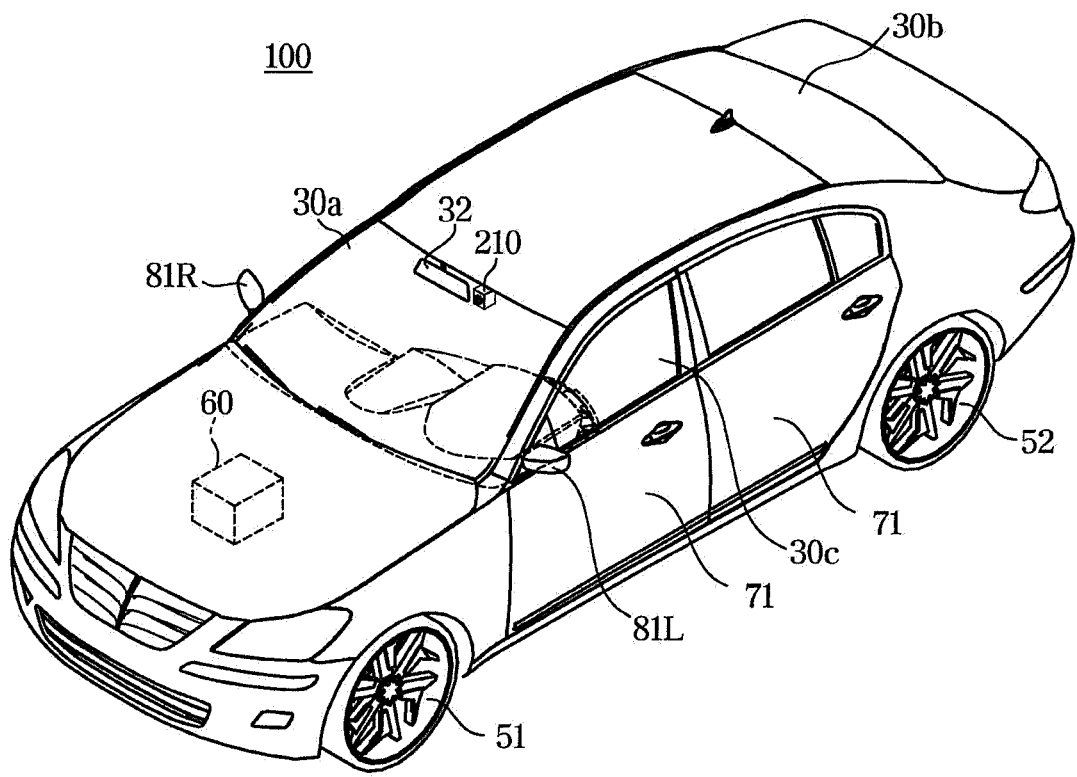
FIG. 1 is a view illustrating the appearance of a vehicle according to an embodiment of the present disclosure.

Reference will now be made in detail to the embodiments of the present disclosure, examples of which are illustrated in the accompanying drawings, wherein like reference numerals refer to like elements throughout. It should be noted that the specification of the present disclosure does not describe all the constituent elements of the embodiments, and general matters well known to those skilled in the art and redundant matters of the embodiments will not be described herein for clarity.

Throughout the specification of the present disclosure, if it is assumed that a certain part is connected (or coupled) to another part, the term "connection or coupling" means that the certain part is directly connected (or coupled) to another part and/or is indirectly connected (or coupled) to another part. Here, indirect connection (or indirect coupling) may conceptually include connection (or coupling) over a wireless communication network.

Throughout the specification of the present disclosure, if it is assumed that a certain part includes a certain component, the term "comprising or including" means that a corresponding component may further include other components unless context clearly indicates otherwise.

The terms "a", "an", "one", "the" and other similar terms include both singular and plural forms, unless context clearly dictates otherwise.

Throughout the specification of the present disclosure, terms " ... part", " ... module", " ... member", " ... block", and the like mean a unit for processing at least one function or operation. For example, the above-mentioned terms may mean at least one hardware (e.g., a Field-Programmable Gate Array (FPGA), an Application Specific Integrated Circuit (ASIC), etc.), at least one software stored in a memory, or at least one process processed by a processor. As used in the specification and appended claims, the term " ... parts", " ... modules", " ... members", or " ... blocks" may be implemented by a single constituent element, or the term " ... part", " ... module", " ... member", or " ... block" may include a plurality of constituent elements.

Identification numbers for use in respective operations to be described later are used for convenience of description and better understanding of the present disclosure, do not describe the order or sequence of the respective operations of the present disclosure, and the respective operations of the present disclosure may be carried out in a different way from the order written in the present disclosure, unless context of each operation clearly indicates a specific order.

The principles of the present disclosure and the embodiments of the present disclosure will hereinafter be given with reference to the attached drawings. A vehicle and a method for controlling the same according to embodiments of the present disclosure will hereinafter be given with reference to the attached drawings.

Figure 2:
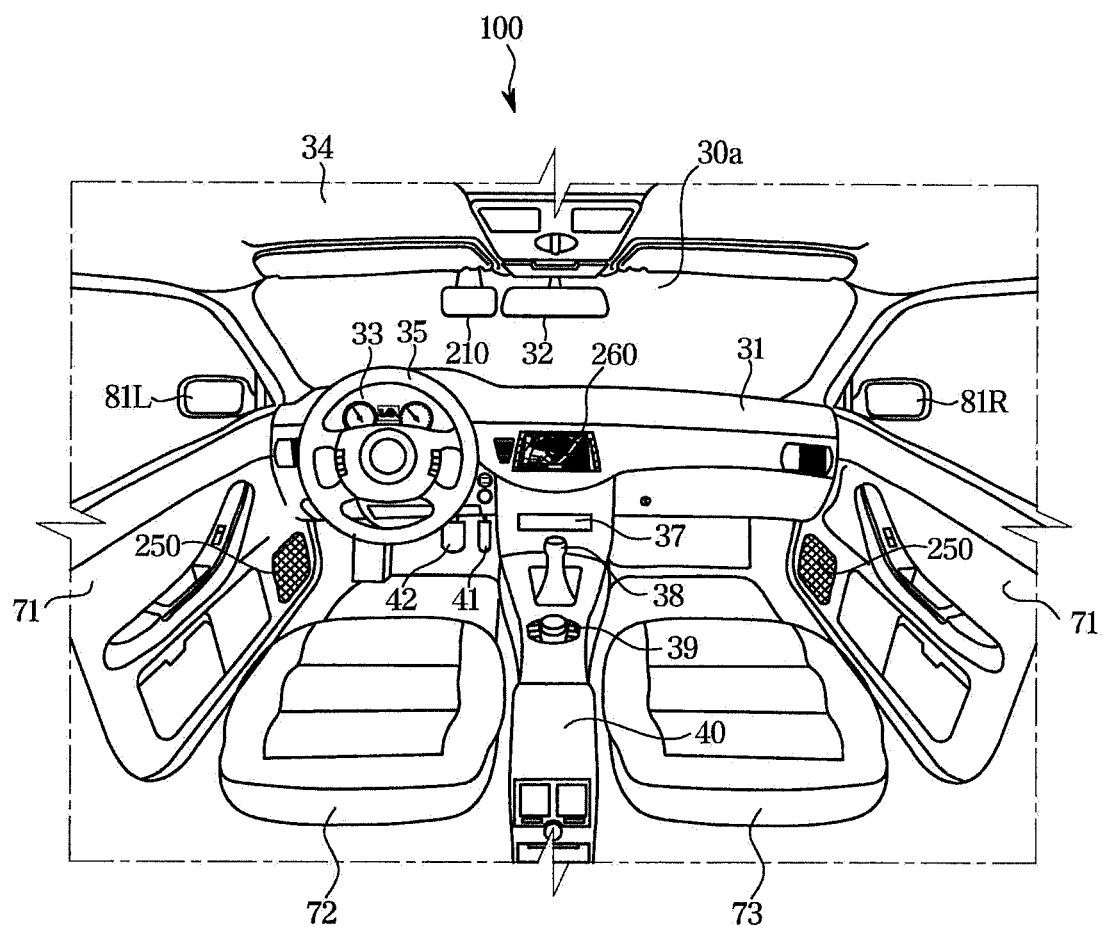
FIG. 2 is a view illustrating the internal structure of a vehicle according to an embodiment of the present disclosure.

FIG. 1 is a view illustrating the appearance of a vehicle 100 according to an embodiment of the present disclosure. FIG. 2 is a view illustrating the internal structure of the vehicle 100 according to an embodiment of the present disclosure.

Referring to FIG. 1, the vehicle 100 according to an embodiment of the present disclosure may include vehicle wheels 51 and 52 to move the vehicle 100 from place to place, doors 71 to shield an indoor space of the vehicle 100 from the outside, a windshield 30a to provide a forward view of the vehicle 100 to a driver who rides in the vehicle 100, a rear window 30b to provide a rear view of the vehicle 100 to the vehicle driver, and side-view mirrors 81L and 81R to provide rear-lateral views of the vehicle 100 to the vehicle driver. The side-view mirrors 12 may include a right side-view mirror 81R to provide a rear-right view of the vehicle 100 to the vehicle driver and a left side-view mirror 81L to provide a rear-left view of the vehicle 100 to the vehicle driver. The vehicle 100 may further include a rear-view mirror (also called a room mirror) 32 to allow the driver to see the indoor space of the vehicle 100 as well as to see a backward region of the vehicle 100. Side windows (hereinafter referred to as windows) 30c to provide a side view of the vehicle 100 may be disposed at upper parts of the doors 71.

A drive device 60 installed in the vehicle 100 may provide rotational force to the front wheels 51 or the rear wheels 52 so as to move the vehicle 100 from place to place.

If the vehicle 100 is a front-wheel-drive (FWD) vehicle, the drive device 60 may provide rotational force to the front wheels 51. If the vehicle 100 is a rear-wheel-drive (RWD) vehicle, the drive device 60 may provide rotational force to the rear wheels 52. Alternatively, if the vehicle 100 is a four-wheel-drive (FWD) vehicle, the drive device 60 may provide rotational force to the front wheels 51 and the rear wheels 52.

The drive device 60 may include an engine to generate rotational force by burning fossil fuels or a motor to generate rotational force upon receiving a power source from a condenser. Alternatively, the drive device 60 may also be implemented as a hybrid device that is provided with an engine and a motor and selectively uses the engine or the motor.

Besides, the vehicle 100 may include a variety of sensing devices, for example, a proximity sensor to detect the presence of obstacles or peripheral vehicles located in peripheral regions of the vehicle 100, a rain sensor to detect the presence or absence of rainfall and the amount of rainfall, an RPM sensor to detect a revolutions per minute (RPM) value, a GPS sensor to detect a current position of the vehicle 100 based on GPS signals, a speed sensor to detect a movement state of the vehicle 100.

An image acquisition part 210 may be provided in the vicinity of the rear-view mirror 104 (room mirror). The image acquisition part 210 to capture an image about a forward region of the vehicle 100 as well as to acquire the captured forward-view image may capture moving images, or may periodically still images.

Although FIGS. 1 and 2 exemplarily illustrate the image acquisition part 210 mounted to side surfaces of the rear-view mirror 32 for convenience of description, the scope or spirit of the vehicle 100 is not limited thereto. Differently from FIGS. 1 and 2, the image acquisition part 210 may also be mounted to the exterior of the vehicle 100. For example, the image acquisition part 210 may be mounted in the vicinity of a grille of a front surface of the vehicle 100, or may be mounted to a bumper of the vehicle 100. It should be noted that the image acquisition part 210 can be mounted to any places where the image acquisition part 210 can capture forward-view images of the vehicle 100, especially, where the image acquisition part 210 can easily capture any object (e.g., a preceding vehicle or a pedestrian) located in a forward region of the vehicle 100.

In addition, only one image acquisition part 210 may be mounted to the vehicle 100 as illustrated in FIG. 1, the scope or spirit of the present disclosure is not limited thereto, and a plurality of image acquisition parts 210 may also be mounted to the vehicle 100 to provide wider-view images. Alternatively, the image acquisition part 210 may be implemented as a stereo camera, such that the image acquisition part 210 may also provide three-dimensional (3D) forward-view images as necessary.

Referring to FIG. 2, an indoor space of the vehicle 100 may include a driver seat 72, a passenger seat 73, a dashboard 31, a steering wheel 35, and an instrument panel 33.

The indoor space of the vehicle 100 may include an accelerator pedal 41 depressed by the driver's foot according to the driver's acceleration intention, and a brake pedal 42 depressed by the driver according to the driver's brake intention.

The dashboard 31 may allow the indoor space of the vehicle 100 and an engine compartment to be separated from each other, and may be a panel in which various kinds of components needed to drive the vehicle 100 are installed. The dashboard 31 may be arranged to face the driver seat 72 and the passenger seat 73.

Each of the doors 71 of the vehicle 100 may be provided with a speaker 250. Although the speakers 250 are mounted to the doors 71 of the vehicle 100 for convenience of description, there is no limitation as to installation positions of the speakers 250.

A display 260 may be installed at an upper panel of the dashboard 31. The display 260 may display images thereon so as to provide the driver or passenger with various kinds of information using the displayed images. For example, the display 260 may visually provide the driver or passengers with maps, weather, news, music, various moving images or still images, and various kinds of information (e.g., air-conditioner information, etc.) associated with states or operations of the vehicle 100.

The display 260 may also be implemented using a general navigation device. In accordance with one embodiment, the display 260 may be implemented as any one of a Liquid Crystal Display (LCD), a Light Emitting Diode (LED), a Plasma Display Panel (PDP), an Organic Light Emitting Diode (OLED), a Cathode Ray Tube (CRT), etc. without being limited thereto.

The display 260 may be installed in a housing that is integrated with the dashboard 31 in one body. If necessary, only a display panel contained in the display 260 may be designed to be exposed outside. Besides, the display 260 may also be installed at various positions capable of being considered by the system designer.

Various kinds of devices, for example, a processor, a communication module, a Global Positioning Satellite (GPS) reception module, a storage device, and the like, may be installed in the dashboard 31. The processor may be configured to control various electronic devices embedded in the vehicle 100, and may be used to perform functions of a controller 230 to be described later. The above-mentioned devices may be implemented using various components, for example, a semiconductor chip, a switch, an integrated circuit (IC), a resistor, a volatile or non-volatile memory, a PCB, or the like.

Meanwhile, a center console 37 may include a jog-wheel center input part 43 or a hard-key center input part 43. The center console 37 may be disposed between the driver seat 72 and the passenger seat 73, and may include a gear lever 38 and a tray 40.

The dashboard 31 may be connected to the steering wheel 35 and the instrument panel 33 that are arranged to face the driver seat.

The steering wheel 35 may be rotatable in a predetermined direction according to the driver's manipulation, and front wheels 51 or rear wheels 52 of the vehicle 100 may rotate in the rotation direction of the steering wheel 35, such that the vehicle 100 can be steered in a driver-desired direction. Although the steering wheel 35 may be formed in a circular shape for convenience of the driver, the shape of the steering wheel 35 is not limited thereto.

The instrument panel 33 may be configured to provide the driver with various kinds of information of the vehicle 100, for example, a vehicle speed, an engine rpm, a residual fuel quantity, an engine oil temperature, blinking or non-blinking of a turn signal indicator, a mileage indicator, etc. The instrument panel 33 may be implemented using lamps, scale marks, or the like, or may also be implemented using a display panel according to an embodiment. If the instrument panel 33 is implemented using the display panel, the instrument panel 33 may display not only the above-mentioned information, but also more various information (e.g., fuel efficiency, execution or non-execution of various functions embedded in the vehicle 100, and the like) using the display panel, such that the driver can easily recognize the displayed information.

Figure 3:
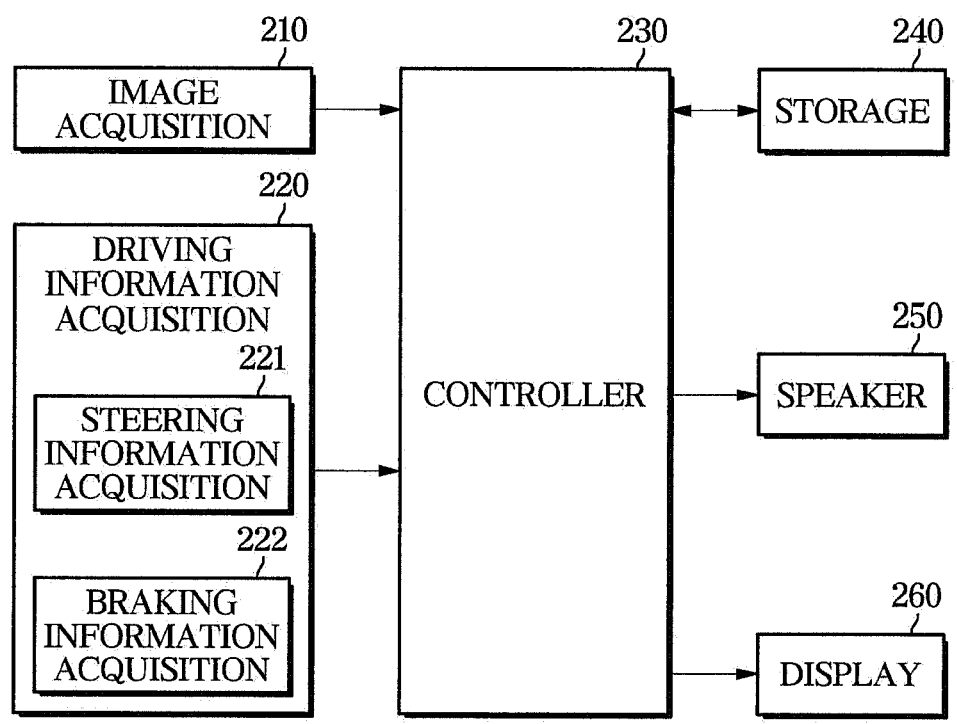
FIG. 3 is a block diagram illustrating a vehicle according to an embodiment of the present disclosure.

FIG. 3 is a block diagram illustrating the vehicle 100 according to an embodiment of the present disclosure. Operations of the vehicle 100 will hereinafter be described with reference to the above-mentioned constituent elements of the vehicle 100 and the block diagram of FIG. 3.

Referring to FIG. 3, the vehicle 100 may include an image acquisition part 210 to acquire a forward-view image of the vehicle 100 by capturing an image about a forward region of the vehicle 100, a driving information acquisition part 220 to acquire traveling information provided with braking information and steering information, and a controller 230. The controller 230 may initially determine a predetermined region based on the center point of the forward-view image to be a Region Of Interest (ROI), may adjust the initially-determined ROI based on at least one of the braking information and the steering information, and may acquire driving assistance information by performing image-processing on the adjusted ROI.

The braking information of the vehicle 100 may indicate not only braking or non-braking of the vehicle 100, but also the braking deceleration of the vehicle 100 in the braking mode. The steering information of the vehicle 100 may indicate a steering direction and a steering angle.

The driving assistance information of the vehicle 100 may assist the driver in easily driving the vehicle 100. The driving assistance information may include at least one of lane departure information indicating occurrence or non-occurrence of lane departure, information about a distance between an object present in a forward region of the vehicle 100 and the vehicle 100, and information about the possibility of collision with the object, without being limited thereto. The driving assistance information may include all kinds of information capable of assisting the driver in easily driving the vehicle 100.

The image acquisition part 210 may include a camera module to capture an image about a forward region of the vehicle 100, or may include a module to receive image data from a front-view camera embedded in the vehicle 100.

The image acquisition part 210 may capture an image about a forward region of the vehicle 100, and may acquire a forward-view image including an object capable of being located in a forward region of the vehicle 100, such that the image acquisition part 210 may transmit the acquired forward-view image to the controller 230.

The object capable of being located in the forward region of the vehicle 100 may include a preceding vehicle traveling in the forward region of the vehicle 100, a pedestrian walking in the forward region of the vehicle 100, an obstacle capable of being located in the forward region of the vehicle 100, and a lane of the traveling road of the vehicle 100, without being limited thereto. The object may include all kinds of things capable of being located in a forward direction of the vehicle 100 without departing from the scope or spirit of the present disclosure.

In order to identify each object located in a forward region of the vehicle 100 as well as to quickly acquire driving assistance information, the vehicle 100 may determine a region of interest (ROI) within the forward region. In this case, the ROI may be adjusted according to vehicle driving information acquired by the driving information acquisition part 220.

The driving information acquisition part 220 may acquire driving information of the vehicle 100, and may transmit the acquired driving information to the controller 230.

The driving information acquired by the driving information acquisition part 220 may indicate a movement state of the vehicle 100. For example, the driving information may be source data from which physical momentum, impulse, motion direction, movement speed, etc. of the vehicle 100 can be acquired. In more detail, the driving information may include a driving speed, driving acceleration, a driving angular speed, a steering direction, a steering angle, a braking or non-braking state, and the braking deceleration of the vehicle 100, without being limited thereto. The driving information may include all kinds of information indicating a movement state of the vehicle 100 without departing from the scope or spirit of the present disclosure. That is, the driving information may include steering information and braking information of the vehicle 100.

In more detail, the driving information acquisition part 220 may include a steering information acquisition part 221 to acquire steering information by detecting a steering direction and a steering angle of the vehicle 100, and a braking information acquisition part 222 to acquire braking information by detecting a braking or non-braking state of the vehicle 100.

The driving information acquisition part 220 may include at least one sensor module to acquire driving information. In more detail, the driving information acquisition part 220 may include a vehicle speed sensor to detect a driving speed of the vehicle 100, an acceleration sensor to detect acceleration of the vehicle 100, an accelerator pedal sensor to detect the position of the accelerator pedal 41, an angular speed sensor to detect an angular speed of the vehicle 100, and the like.

The steering information acquisition part 221 of the driving information acquisition part 220 may include a steering wheel sensor to detect a rotation direction and a rotation angle of the steering wheel 35, an angular speed sensor to detect an angular speed of the vehicle 100, etc. without being limited thereto. The steering information acquisition part 221 may include all kinds of things capable of acquiring steering information by detecting a steering direction and steering angle of the vehicle 100 without departing from the scope or spirit of the present disclosure.

The braking information acquisition part 222 of the driving information acquisition part 220 may include a braking deceleration sensor to detect a braking deceleration of the vehicle 100, a braking pedal sensor to detect the position of the brake pedal 42, etc. without being limited thereto. The braking information acquisition part 222 may include all kinds of things capable of acquiring braking information by detecting a braking or non-braking state and a braking deceleration of the vehicle 100 without departing from the scope or spirit of the present disclosure.

If the ROI is fixed without being dynamically determined according to vehicle driving information, it may be impossible to accurately detect what the object is, as well as to quickly acquire driving assistance information. The controller 230 may dynamically determine the ROI in consideration of driving information. In more detail, the controller 230 may dynamically determine the ROI in consideration of steering information and braking information contained in the driving information. In this case, the ROI may be acquired by adjusting at least one of a position parameter and a size parameter within the forward-view image.

The controller 230 may receive a forward-view image from the image acquisition part 210, and may receive driving information having both steering information and braking information from the driving information acquisition part 220. The controller 230 may initially determine a predetermined region selected based on the center point of the forward-view image from among the forward-view image, to be a region of interest (ROI), and may adjust the initially-determined ROI using at least one of the received steering information and the received braking information. In addition, the controller 230 may determine the ROI using at least one of the steering information and the braking information within the received forward-view image. A detailed description thereof will hereinafter be described.

The controller 230 may acquire driving assistance information by performing image processing on the ROI image. The driving assistance information of the vehicle 100 may assist the driver in easily driving the vehicle 100. In more detail, the controller 230 may acquire driving assistance information for facilitating a driving behavior of the driver using a Forward Collision Warning (FCW) system and a Lane Departure Warning System (LDWS).

The driving assistance information may include at least one of lane departure information indicating whether there occurs a lane departure of the vehicle 100, distance information between the preceding object and the vehicle 100, and collision warning information indicating whether there is a high possibility of collision between the vehicle 100 and the preceding object.

The controller 230 may include at least one memory storing a program needed to perform the above-mentioned operations and the following operations, and at least one processor to execute the stored program. If multiple memories and multiple processors are used, the memories or processors may be integrated into one chip or may also be physically spaced apart from each other.

The vehicle 100 may include a storage 240 to store a forward-view image, driving information, a coordinated ROI, and an acquired driving assistance information.

Although the storage 240 may be implemented as any one of a non-volatile memory (e.g., a cache, a Read Only Memory (ROM), a Programmable ROM (PROM), an Erasable Programmable ROM (EPROM), an Electrically Erasable Programmable ROM (EEPROM), a flash memory, etc.), a volatile memory (e.g., a Random Access Memory (RAM)), and a storage medium (e.g., a Hard Disk Drive (HDD), a CD-ROM, etc.), the scope or spirit of the present disclosure is not limited thereto.

The vehicle 100 may further include the speaker 250 to output the acquired driving assistance information so as to provide the driver with the acquired driving assistance information.

The speaker 250 may output driving assistance information according to a control signal of the controller 230. In more detail, the speaker 250 may output a warning sound or warning message indicating a lane departure of the vehicle 100 based on lane departure information indicating occurrence or non-occurrence of such lane departure of the vehicle 100. The speaker 250 may output a message indicating distance information based on a distance between the preceding object and the vehicle 100, and may output a warning sound or warning message indicating the high possibility of collision with the preceding object based on information about the possibility of collision with the preceding object.

The vehicle 100 may include a display 260 to display the coordinated ROI and the acquired driving assistance information so as to provide the driver with the coordinated ROI and the acquired driving assistance information.

The display 260 may output driving assistance information according to a control signal of the controller 230. In more detail, the display 260 may display not only a warning message which informs the driver of a lane departure based on lane departure information indicating whether there occurs a lane departure of the vehicle 100, but also a message indicating distance information based on a distance between the preceding object and the vehicle 100. In addition, the display 260 may further display a warning message indicating the high possibility of collision with the preceding object based on information about whether there is a high possibility of collision between the vehicle 100 and the preceding object.

The display 260 may display the coordinated ROI according to a control signal of the controller 230, and may further display a forward-view image acquired by the image acquisition part 210.

FIGS. 4A and 4B are conceptual diagrams illustrating examples for adjusting an ROI based on steering information according to an embodiment of the present disclosure.

Referring to FIG. 4A, the image acquisition part 210 may acquire the forward-view image 400 by capturing an image about a forward region of the vehicle 100. The image acquisition part 210 may transmit the acquired forward-view image 400 to the controller 230.

The controller 230 may acquire the forward-view image 400 from the image acquisition part 210, and may initially determine a predetermined region of the acquired forward-view image 400 to be a region of interest (ROI) 410. The initially-determined ROI 410 may be set to a predetermined region based on the center point of the forward-view image 400 within the forward-view image 400.

The initially-determined ROI 410 may be formed to have a predetermined size through which the preceding object affecting driving of the vehicle 100 can be identified. For example, a horizontal width (i.e., a left and right width) of the initially-determined ROI 410 may be determined based on the current lane of the vehicle 100, and a vertical width (i.e., an up and down width) of the initially-determined ROI 410 may be determined based on a road disappearance point at which a road disappears from the displayed image.

Referring to FIG. 4B, the controller 230 may adjust or coordinate the initially-determined ROI 410 based on steering information of the vehicle 100. In more detail, the controller 230 may adjust or coordinate the initially-determined ROI 410 in consideration of the steering direction and the steering angle of the vehicle 100.

The controller 230 may determine the steering direction of the vehicle 100 based on the steering information received from the steering information acquisition part 220. In more detail, the controller 210 may determine whether the vehicle was steered to the left or right based on the steering information. An exemplary case in which the vehicle 100 is steered to the right by the driver who turns the steering wheel 35 to the right will hereinafter be described with reference to the attached drawings.

If the driver of the vehicle 100 turns the steering wheel 35 to the right, the front wheels 51 of the vehicle 100 may rotate to turn the vehicle 100 to the right. In this case, a movement route 450 of the vehicle 100 may be formed not as a straight line, but as a curved line that is curved to the right.

If the vehicle 100 is steered to the right by the driver who manipulates the steering wheel 35, there is a need to detect the presence or absence of an object located in the movement route 450 of the vehicle 100. Therefore, according to the steering direction of the vehicle 100, the controller 230 may move the position of the ROI 410 from the center point of the forward-view image 400 in the same direction as the steering direction of the vehicle 100, such that the controller 230 may adjust or coordinate the initially-determined ROI 410.

The coordinated ROI 420 may include a predetermined region that is formed to have the object located in the steering direction of the vehicle 100 after the vehicle 100 has moved from the center point of the forward-view image 400 in the same direction as in the steering direction.

The controller 230 may determine the steering angle of the vehicle 100 based on the steering information received from the driving information acquisition part 220, and may shift the position of the initially-determined ROI 410 from the center point of the forward-view image 400 in the same direction as the steering direction in proportion to the steering angle, thereby adjusting or coordinating the initially-determined ROI 410.

Through position coordination of the initially-determined ROI 410, the vehicle 100 may select a necessary region as an ROI, and may acquire driving assistance information needed to drive the vehicle 100.

The controller 230 may select or determine the coordinated ROI 420 based on the steering information received from the driving information acquisition part 220. In more detail, the controller 230 may not initially determine the ROI, and may move the ROI position from the center point of the forward-view image in the same direction as the steering direction based on the steering information, such that the controller 230 may thus acquire or determine the coordinated ROI 420. The controller 230 may determine the steering angle of the vehicle 100 based on the steering information received from the driving information acquisition part 220, and may move the ROI position from the center point of the forward-view image 400 in the same direction as the steering direction in proportion to the steering angle, such that the controller 230 may acquire or determine the coordinated ROI 420.

Figure 5A:
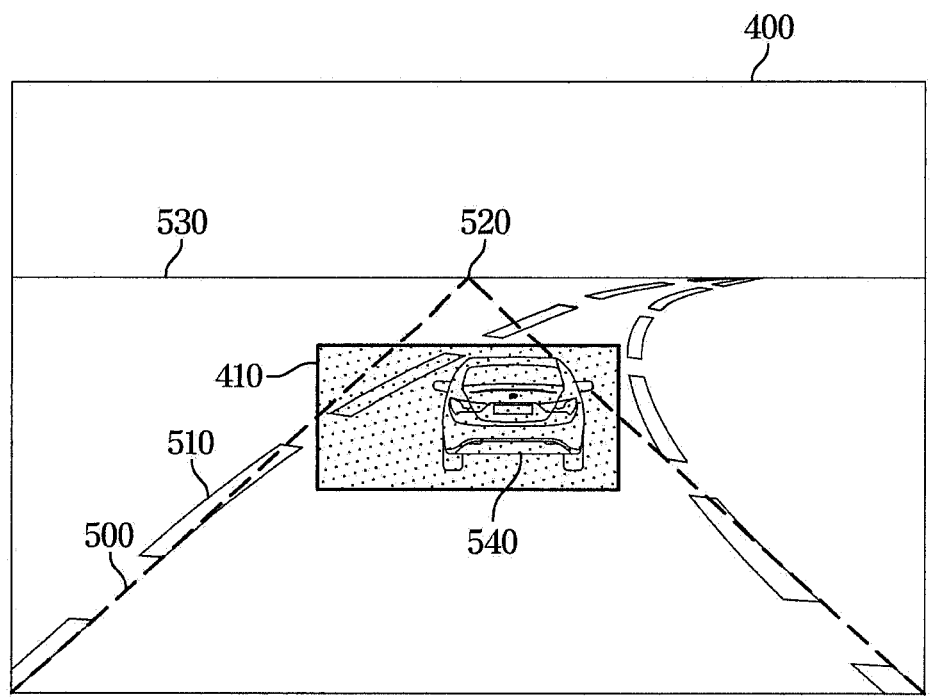
FIGS. 5A and 5B are conceptual diagrams illustrating examples for adjusting an ROI based on steering information according to an embodiment of the present disclosure.
Figure 5B:
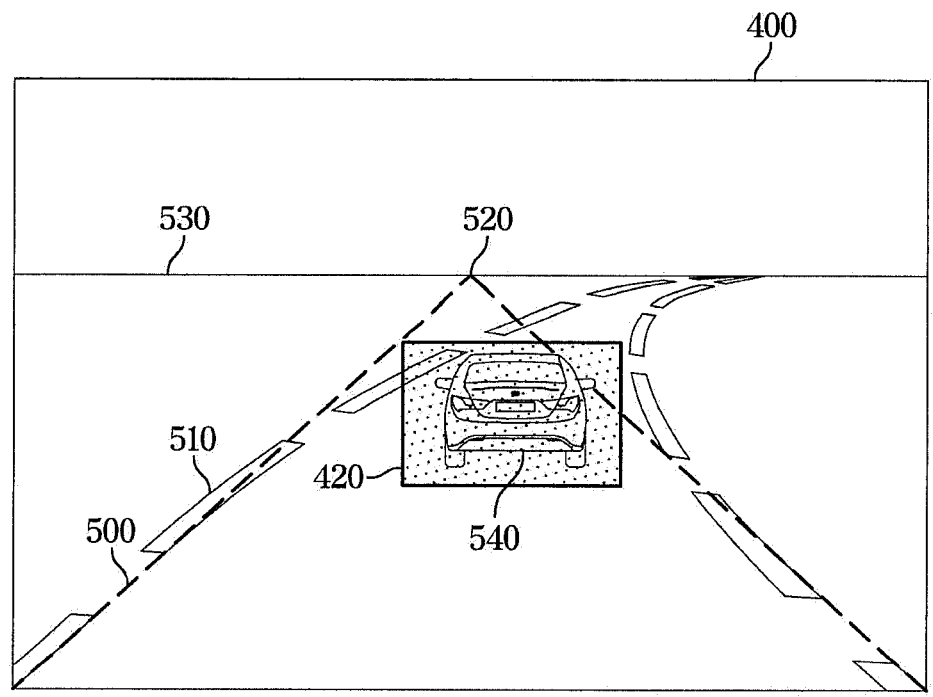

FIGS. 5A and 5B are conceptual diagrams illustrating examples for adjusting or coordinating the ROI based on the steering information according to an embodiment of the present disclosure.

Referring to FIG. 5A, the controller 230 may acquire the forward-view image 400 from the image acquisition part 410, and may initially determine a predetermined region of the acquired forward-view image 400 to be the ROI 410. The initially-determined ROI 410 may be set to a predetermined region based on the center point of the forward-view image 400 within the forward-view image 400.

The initially-determined ROI 410 may be formed to have a predetermined size through which the preceding object capable of affecting driving of the vehicle 100 can be identified. For example, a horizontal width (i.e., a left and right width) of the initially-determined ROI 410 may be determined based on the current lane of the vehicle 100, and a vertical width (i.e., an up and down width) of the initially-determined ROI 410 may be determined based on a road disappearance point 520.

The disappearance point 520 may indicate a specific point where the road disappears from the forward-view image 400. For example, the disappearance point 520 may indicate the end of the road displayed on the image acquired by the image acquisition part 210. In order to determine the disappearance point 520, the controller 230 may convert the forward-view image 400 into a canny-edge image, and may acquire one or more components 500 indicating a straight line (hereinafter referred to as at least one straight-line component 500) using Hough transform. The controller 230 may determine a single point at which the straight-line components 500 acquired by Hough transform are collected. In addition, a vertical value of coordinates indicating the disappearance point 520 on the image may be set to the horizon 530 of the image. However, as shown in FIG. 5A, according to the curved degree of the road, the disappearance point 520 may not be identical to an actual disappearance point at which the road actually disappears from the forward-view image 400.

The object capable of being located in a forward direction of the vehicle 100 may appear only within a predetermined range extending downward from the disappearance point 520. In more detail, since the vehicle 100 generally moves only within the road, the preceding object may appear only in a predetermined range extending downward from the end or disappearance point of the road on the forward-view image 400.

The controller 230 may determine a vertical width of the ROI based on the disappearance point 520 in the forward-view image 400 using the above-mentioned characteristics. In more detail, as shown in FIG. 5A, the controller 230 may adjust or coordinate the vertical width of the ROI based on the center point of the forward-view image 400 in a manner that the coordinated ROI includes a region that is formed to extend downward from the disappearance point 520 by a predetermined distance, such that the controller 230 may initially determine the ROI. The initially-determined ROI 410 in the forward-view image 400 may include a predetermined region formed to include the preceding object of the vehicle 100. For example, the initially-determined ROI 410 in the forward-view image 400 may include the region having a preceding vehicle 540 located in a forward direction of the vehicle 100.

The controller 230 may adjust or coordinate the vertical width of a predetermined image in the forward-view image 400 in a manner that the predetermined image includes not only a first region extending upward from the disappearance point 520 by a first distance on the basis of the center point of the forward-view image 400, but also a second region extending downward from the disappearance point 520 by a second distance on the basis of the center point of the forward-view image 400, resulting in formation of the initially-determined ROI. In this case, the predetermined image having the first region extending upward from the disappearance point 520 and the second region extending downward from the disappearance point 520 may allow the first region to have a narrower width than the second region. That is, the first distance for use in the first region may be shorter than the second distance for use in the second region.

Referring to FIG. 5B, the controller 230 may adjust or coordinate the initially-determined ROI based on the steering information. In more detail, the controller 230 may adjust or coordinate the initially-determined ROI 410 to be gradually reduced in size according to the steering information. As a result, the controller 230 may perform image processing of only the resultant ROI 420 smaller in size than the initially-determined ROI 410, such that the controller 230 may reduce the amount of image processing data, and may thus acquire valid or effective information while simultaneously performing image processing using the reduced amount of image processing data.

The controller 230 may determine the steering direction of the vehicle 100 based on the steering information received from the driving information acquisition part 220. In more detail, the controller 210 may determine whether the vehicle 100 has turned to the right or left based on the steering information. An exemplary case in which the driver of the vehicle 100 turns the steering wheel 35 to the right such that the vehicle 100 is steered to the right will hereinafter be described with reference to the attached drawings.

If the driver of the vehicle 100 turns the steering wheel 35 to the right, the front wheels 51 of the vehicle 100 may rotate to turn the vehicle 100 to the right. As illustrated in FIG. 5B, if the lane 510 is formed as a curved line that is curved to the right, the driver may turn the steering wheel 35 to the right.

If the vehicle 100 turns to the right by the driver who manipulates the steering wheel 35, some regions in the left region of the initially-determined ROI 410 may not affect the vehicle 100 serving to generate driving assistance information whereas they are not image-processed. The driving assistance information may be information about the object capable of being located in the traveling route of the vehicle 100, such that some regions located in the direction opposite to the steering direction of the vehicle 100 within the initially-determined ROI 410 need not be image-processed.

Therefore, the controller 230 may adjust or coordinate the size of the initially-determined ROI 410 according to the steering direction in a manner that unnecessary regions are excluded from the initially-determined ROI 410, such that the amount of image processing data is greatly reduced, resulting in rapid acquisition of valid information and reduction in a total image processing time.

In more detail, the controller 230 may determine the steering direction of the vehicle 100 based on the steering information, and may shift a boundary of the initially-determined ROI 410 in the opposite direction of the steering direction of the vehicle 100 in the same direction as the steering direction, such that the controller 230 may reduce the size of the initially-determined ROI 410, resulting in formation of the coordinated ROI 420.

For example, as illustrated in FIG. 5B, the controller 230 may determine whether the vehicle 100 turns to the right based on the steering information, and may move a boundary of the initially-determined ROI 410 in the left direction opposite to the steering direction of the vehicle 100, to the right identical to the steering direction of the vehicle 100, such that the controller 230 may reduce the size of the initially-determined ROI 410, resulting in formation of the coordinated ROI 420.

The boundary in the left direction of the coordinated ROI 410 may be shifted to the right more than the initially-determined ROI 410, such that some regions in the left direction may be excluded from the initially-determined ROI 410, and the coordinated ROI 420 may be smaller in size than the initially-determined ROI 410.

The controller 230 may determine the steering angle of the vehicle 100 based on the steering information received from the driving information acquisition part 220. The controller 230 may shift a boundary of the initially-determined ROI 410 in the direction opposite to the steering direction of the vehicle 100 in proportion to the steering angle, and may thus the size of the initially-determined ROI 410, resulting in formation of the coordinated ROI 420.

The controller 230 may determine the coordinated ROI 420 based on the steering information received from the driving information acquisition part 220. In detail, the controller 230 may not initially determine the ROI, and may reduce the ROI size based on the steering information, such that the controller 230 may determine the coordinated ROI 420 smaller in size than the initially-determined ROI 410. In the coordinated ROI 420, the reduced part may correspond to a specific part belonging to the opposite direction of the steering direction. The controller 230 may determine the steering angle of the vehicle 100 based on the steering information received from the driving information acquisition part 220, and may reduce the ROI size in proportion to the steering angle, resulting in formation of the coordinated ROI 420.

Figure 6A:
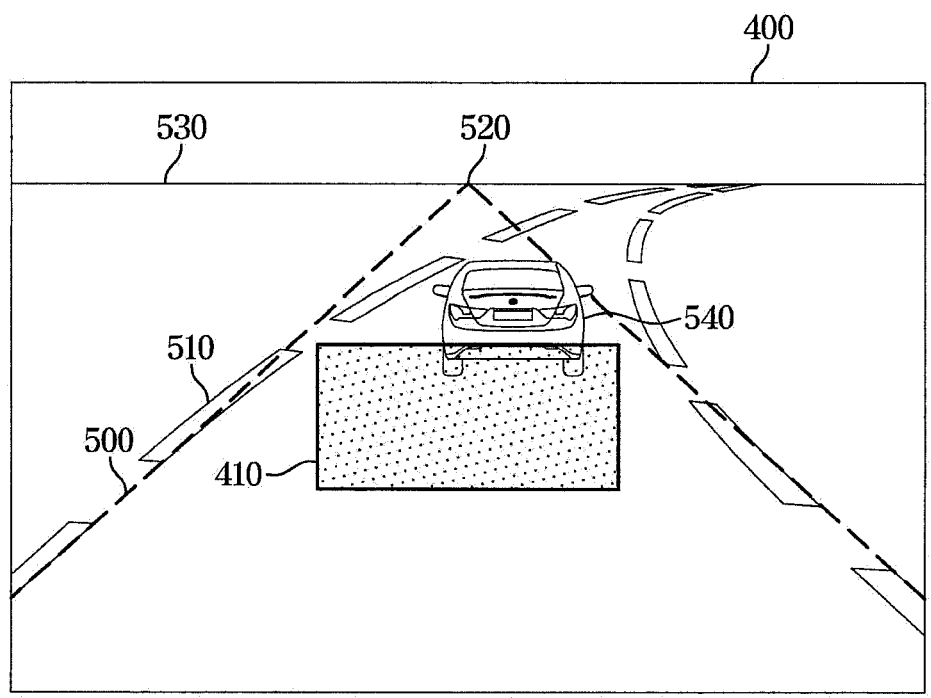
FIGS. 6A, 6B, and 6C are conceptual diagrams illustrating examples for adjusting an ROI based on braking information of a vehicle according to an embodiment of the present disclosure.
Figure 6B:
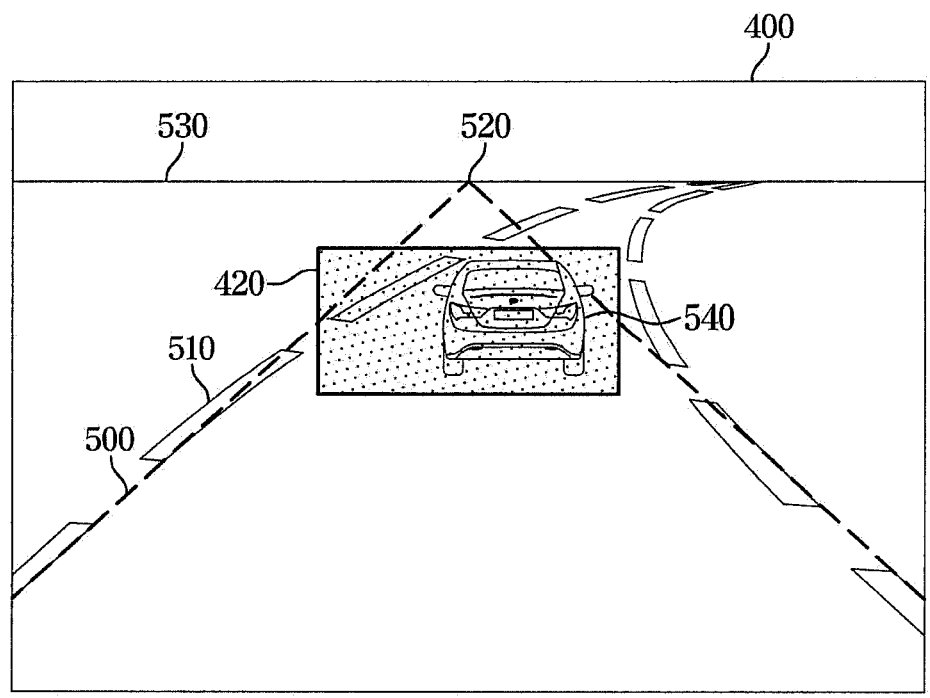
Figure 6C:
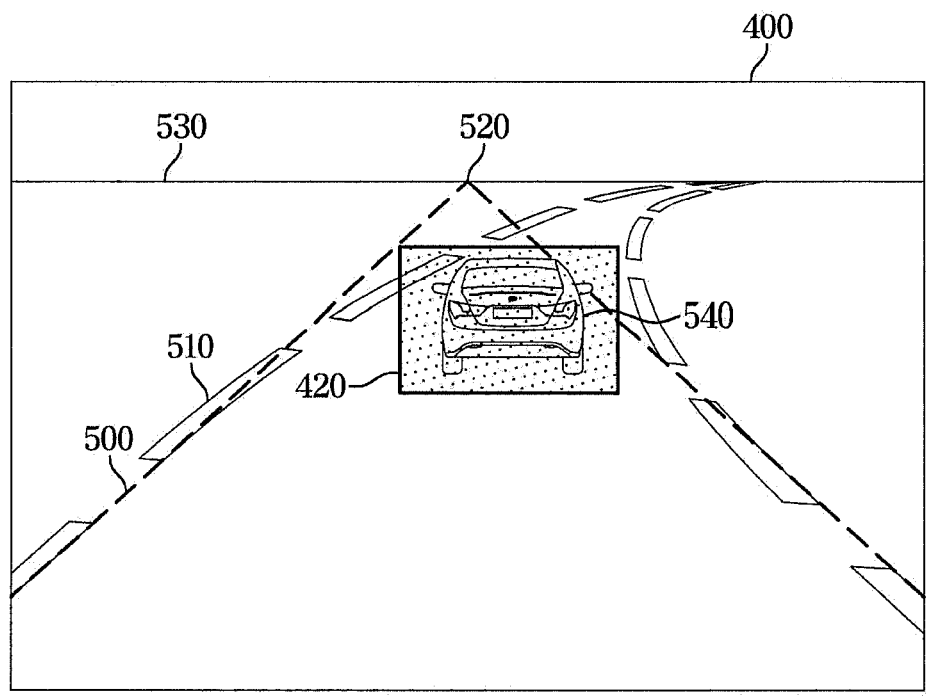

FIGS. 6A, 6B, and 6C are conceptual diagrams illustrating examples for adjusting or coordinating the ROI based on braking information of a vehicle according to an embodiment of the present disclosure.

Referring to FIGS. 6A, 6B, and 6C, the controller 230 may acquire the forward-view image 400 from the image acquisition part 210, and may initially determine a predetermined region of the acquired forward-view image 400 to be the ROI 410. The initially-determined ROI 410 may be set to a predetermined range centering around the center point of the forward-view image 400 within the forward-view image 400.

Referring to FIG. 6A, the forward-view image 400 acquired by the image acquisition part 210 of the vehicle 100 during braking of the vehicle 100 may be captured in a more downward direction than the forward-view image 400 (see FIG. 5A) acquired by the image acquisition part 210 during non-braking of the vehicle 100. That is, the forward-view image 400 shown in FIG. 6A may have a larger downward captured image than the forward-view image 400 shown in FIG. 5A.

If the driver depresses the brake pedal 42, braking of the vehicle 100 may be carried out by a brake module embedded in wheel cylinders of the vehicle 100. During braking of the vehicle 100, a body of the vehicle 100 may be tilted toward the traveling direction of the vehicle 100 with respect to the surface arranged horizontal to the ground. That is, the body of the vehicle 100 may be tilted in a manner that the body located close to the front wheels 51 is directed in the direction of the ground and the body located close to the rear wheels 52 is directed in the opposite direction of the ground direction.

During braking of the vehicle 100, the body of the vehicle 100 is tilted toward the traveling direction with respect to the surface horizontal to the ground due to occurrence of inertia, such that the image acquisition part 210 embedded in the vehicle 100 may also be tilted together with the body of the vehicle 100.

In this case, the image acquisition part 210 tilted in the traveling direction with respect to the surface horizontal to the ground may acquire the forward-view image 400 that is captured in a braking mode of the vehicle 100 in a more downward direction than the forward-view image 400 of FIG. 5A captured in a non-braking mode of the vehicle 100.

In more detail, as shown in FIG. 6A, the lane 510, the disappearance point 520, the horizon 530, and the preceding vehicle 540 displayed in the forward-view image 400 acquired in the braking mode of the vehicle 100 may be higher in display position than the lane 510, the disappearance point 520, the horizon 520, and the preceding vehicle 540 displayed in the other forward-view image 400 acquired in the non-raking mode of the vehicle 100. The reason why the lane 510, the disappearance point 520, the horizon 530, and the preceding vehicle 540 displayed in the forward-view image 400 acquired in the braking mode of the vehicle 100 (see FIG. 6A) are displayed at higher positions as compared to the other forward-view image 400 acquired in the braking mode of the vehicle 100 (see FIG. 5A) is that the image acquisition part 210 is tilted along with the vehicle body in the braking mode of the vehicle 100 such that the forward-view image 400 acquired by the tilted image acquisition part 210 in the braking mode of the vehicle 100 has a larger downward region than the other forward-view image 400 acquired in the non-braking mode of the vehicle 100.

Therefore, during braking of the vehicle 100, the initially-determined ROI 410 in the forward-view image 400 may be spaced farther apart from the disappearance point 520, such that the initially-determined ROI may not include the region provided with the preceding object capable of affecting driving of the vehicle 100.

During braking of the vehicle 100, the controller 230 may move the position of the initially-determined ROI 410 in an upward direction from the center point of the forward-view image 400, such that the controller 230 may adjust or coordinate the initially-determined ROI 410.

Referring to FIG. 6B, the controller 230 may determine the braking or non-braking state of the vehicle 100 based on the braking information received from the driving information acquisition part 220.

In the braking mode of the vehicle 100, the controller 230 may adjust or coordinate the initially-determined ROI 410 by moving the position of the initially-determined ROI 410 in an upward direction from the center point of the forward-view image 400.

In addition, the controller 230 may determine the braking deceleration of the vehicle 100 based on the braking information received from the driving information acquisition part 220, may move the position of the initially-determined ROI 410 in an upward direction from the center point of the forward-view image 400 in proportion to the braking deceleration, and may thus adjust or coordinate the ROI.

The coordinated ROI 420 may be shifted in a more upward direction than the initially-determined ROI 410, such that the coordinated ROI 420 may include the region provided with the preceding object capable of affecting driving of the vehicle 100. In more detail, as shown in FIG. 6B, the coordinated ROI 420 may include the region provided with the preceding vehicle 540 affecting driving of the vehicle 100 in a different way from the initially-determined ROI 410.

Through position coordination of the initially-determined ROI 410, the vehicle 100 may determine a necessary region to be an ROI, and may acquire driving assistance information needed to drive the vehicle 100.

The controller 230 may determine the coordinated ROI 420 based on the braking information received from the driving information acquisition part 220. In more detail, the controller 230 may not initially determine the ROI, and may move the ROI position in the upward direction from the center point of the forward-view image 400 according to the braking information, resulting in formation of the coordinated ROI 420.

Referring to FIG. 6C, the controller 230 may adjust or coordinate the position and size of the initially-determined ROI 410 in consideration of the braking information and the steering information received from the driving information acquisition part 220.

Referring to FIG. 6C, the controller 230 may determine the braking or non-braking state of the vehicle 100 based on the braking information received from the driving information acquisition part 220, and may determine the steering direction of the vehicle 100 based on the steering information received from the driving information acquisition part 220. If braking of the vehicle 100 has occurred, the controller 230 may move the position of the initially-determined ROI 410 in the upward direction from the center point of the forward-view image 400, may move a boundary of the initially-determined ROI 410 in the opposite direction of the steering direction in the same direction as the steering direction of the vehicle 100, and may reduce the size of the initially-determined ROI 410, thereby adjusting or coordinating the initially-determined ROI 410.

The controller 230 may determine the steering angle and the braking deceleration of the vehicle 100 based on the steering information and the braking information received from the driving information acquisition part 220, and may adjust or coordinate the size and position of the initially-determined ROI 410 in proportion to the steering angle and the braking deceleration.

The controller 230 may determine the braking or non-braking state of the vehicle 100 and the steering direction of the vehicle 100 upon receiving the braking information and the steering information from the driving information acquisition part 220. In the braking mode of the vehicle 100, the controller 230 may move the position of the initially-determined ROI 410 in the upward direction from the center point of the forward-view image 400, and may move the position of the initially-determined ROI 410 in the same direction as the steering direction with respect to the center point of the forward-view image 400, resulting in formation of the coordinated ROI 420.

The controller 230 may determine the coordinated ROI 420 based on the steering information and the braking information received from the driving information acquisition part 220. In more detail, the controller 230 may not initially determine the ROI, may move the ROI position in the upward direction from the center point of the forward-view image according to the braking information, and may reduce the size of the initially-determined ROI based on the steering information, resulting in formation of the coordinated ROI 420. In the coordinated ROI 420, the reduced part may correspond to a specific part belonging to the opposite direction of the steering direction.

The controller 230 may determine the coordinated ROI 420 based on the steering information and the braking information received from the driving information acquisition part 220. In more detail, the controller 230 may not initially determine the ROI, may move the ROI position in the upward direction from the center point of the forward-view image based on the braking information, and may move the position of the initially-determined ROI 410 in the same direction as the steering direction with respect to the center point of the forward-view image 400, resulting in formation of the coordinated ROI 420.

A vehicle control method according to one aspect of the present disclosure will hereinafter be described with reference to the attached drawings. The vehicle 100 for use in the above-mentioned embodiments may be applied to this vehicle control method. Therefore, the above-mentioned content disclosed in FIGS. 1 to 6C may also be equally applied to the vehicle control method.

Figure 7:
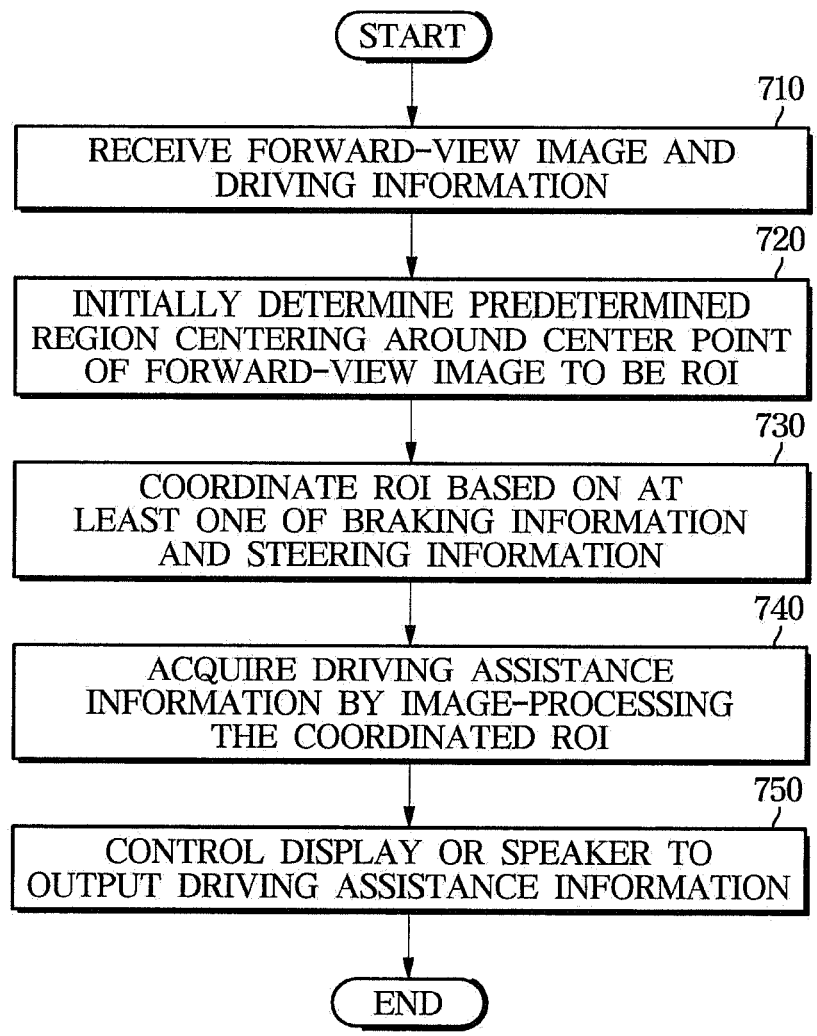
FIG. 7 is a flowchart illustrating a method for controlling a vehicle according to an embodiment of the present disclosure.

FIG. 7 is a flowchart illustrating a method for controlling the vehicle according to an embodiment of the present disclosure.

Referring to FIG. 7, the controller 230 of the vehicle 100 may receive the forward-view image 400 and the driving information (710). In more detail, the controller 230 may receive the forward-view image 400 from the image acquisition part 210 that is designed to acquire the forward-view image 400 by capturing an image about the forward region of the vehicle 100. The controller 230 may receive the driving information from the driving information acquisition part 220 that is designed to acquire the driving information having both braking information and steering information of the vehicle 100.

The controller 230 of the vehicle 100 may initially determine a predetermined region centering around the center point of the forward-view image 400 within the forward-view image 400 to be a region of interest (ROI) (720). The initially-determined ROI 410 may be formed to have a predetermined size through which the preceding object affecting the driving of the vehicle 100 can be identified. For example, a horizontal width (i.e., a left and right width) of the initially-determined ROI 410 may be determined based on the current lane of the vehicle 100, and a vertical width (i.e., an up and down width) of the initially-determined ROI 410 may be determined based on the road disappearance point at which the road disappears from the displayed image.

The controller 230 of the vehicle 100 may adjust or coordinate the ROI based on at least one of the braking information and the steering information (730). In more detail, the controller 230 may adjust or coordinate the initially-determined ROI 410 based on at least one of the braking information and the steering information, resulting in formation of the coordinated ROI 420.

The controller 230 may determine the steering direction of the vehicle 100 based on the steering information, and may move the position of the initially-determined ROI 410 in the same direction as the steering direction with respect to the center point of the forward-view image 400, such that the initially-determined ROI 410 can be adjusted or coordinated. In addition, the controller 230 may determine the steering angle of the vehicle 100 based on the steering information, and may move the position of the initially-determined ROI 410 in proportion to the steering angle.

The controller 230 may determine the steering direction of the vehicle 100 based on the steering information, may move a boundary of the initially-determined ROI 410 in the opposite direction of the steering direction of the vehicle 100 in the same direction as the steering direction, and may reduce the size of the initially-determined ROI 410, resulting in formation of the initially-determined ROI 410. In addition, the controller 230 may determine the steering angle of the vehicle 100 based on the steering information of the vehicle 100, and may reduce the size of the initially-determined ROI 410 in proportion to the steering angle, such that the initially-determined ROI 410 can be adjusted or coordinated.

The controller 230 may determine the braking or non-braking state of the vehicle 100 based on the braking information. In the braking mode of the vehicle 100, the controller 230 may move the position of the initially-determined ROI 410 in the upward direction from the center point of the forward-view image 410, such that the initially-determined ROI 410 can be adjusted or coordinated. The controller 230 may determine the braking deceleration based on the braking information, and may move the position of the initially-determined ROI 410 in proportion to the braking deceleration, such that the initially-determined ROI 410 can be adjusted or coordinated.

The controller 230 may adjust or coordinate the position and size of the initially-determined ROI 410 in consideration of the braking information and the steering information received from the driving information acquisition part 220.

The controller 230 may determine the braking or non-braking state and the steering direction of the vehicle 100 based on the braking information and the steering information received from the driving information acquisition part 220. In the braking mode of the vehicle 100, the controller 230 may move the position of the initially-determined ROI 410 in the upward direction from the center point of the forward-view image 400, may move the boundary of the initially-determined ROI 410 in the opposite direction of the steering direction in the same direction as the steering direction, and may reduce the size of the initially-determined ROI 410, such that the initially-determined ROI 410 can be adjusted or coordinated.

The controller 230 may determine the steering angle and the braking deceleration based on the steering information and the braking information received from the driving information acquisition part 220, and may adjust or coordinate the size and position of the initially-determined ROI 410 in proportion to the steering angle and the braking deceleration.

The controller 230 may determine the braking or non-braking state and the steering direction of the vehicle 100 based on the braking information and the steering information received from the driving information acquisition part 220. In the braking mode of the vehicle 100, the controller 230 may move the position of the initially-determined ROI 410 in the upward direction from the center point of the forward-view image 400, and may move the position of the initially-determined ROI 410 in the same direction as the steering direction with respect to the center point of the forward-view image 410, such that the initially-determined ROI can be adjusted or coordinated.

The controller 230 may not initially determine the ROI, and may determine the coordinated ROI based on at least one of the braking information and the steering information received from the driving information acquisition part 220.

In more detail, the controller 230 may determine the coordinated ROI 420 based on the steering information received from the driving information acquisition part 220. In more detail, the controller 230 may not initially determine the ROI, and may move the ROI position in the same direction as the steering direction with respect to the center point of the forward-view image based on the steering information, resulting in formation of the coordinated ROI 420. The controller 230 may determine the steering angle of the vehicle 100 based on the steering information received from the driving information acquisition part 220, and may move the ROI position in the same direction as the steering direction with respect to the center point of the forward-view image, resulting in formation of the coordinated ROI 420.

The controller 230 may determine the coordinated ROI 420 based on the steering information received from the driving information acquisition part 220. In more detail, the controller 230 may not initially determine the ROI, and may reduce the ROI size based on the steering information, resulting in formation of the coordinated ROI 420. In the coordinated ROI 420, the reduced part may correspond to a specific part belonging to the opposite direction of the steering direction. The controller 230 may determine the steering angle of the vehicle 100 based on the steering information received from the driving information acquisition part 220, and may reduce the ROI size in proportion to the steering angle, resulting in formation of the coordinated ROI 420.

The controller 230 may determine the coordinated ROI 420 based on the braking information received from the driving information acquisition part 220. In more detail, the controller 230 may not initially determine the ROI, and may move the ROI position in the upward direction from the center point of the forward-view image, resulting in formation of the coordinated ROI 420.

The controller 230 may determine the coordinated ROI 420 based on the steering information and the braking information received from the driving information acquisition part 220. In more detail, the controller 230 may not initially determine the ROI, may move the ROI position in the upward direction from the center point of the forward-view image according to the braking information, and may reduce the ROI size, resulting in formation of the coordinated ROI 420. In the coordinated ROI 420, the reduced part may correspond to a specific part belonging to the opposite direction of the steering direction.

The controller 230 may determine the coordinated ROI 420 based on the steering information and the braking information received from the driving information acquisition part 220. In more detail, the controller 230 may not initially determine the ROI, may move the ROI position in the upward direction from the center point of the forward-view image according to the braking information, and may move the position of the initially-determined ROI 410 in the same direction as the steering direction with respect to the center point of the forward-view image 400, resulting in formation of the coordinated ROI 420.

The controller 230 of the vehicle 100 may acquire driving assistance information by performing image processing on the coordinated ROI 420 (740). The driving assistance information of the vehicle 100 may assist the driver in easily driving the vehicle 100. In more detail, the controller 230 may acquire driving assistance information capable of assisting the driver in easily driving the vehicle 100 using a Forward Collision Warning (FCW) system and a Lane Departure Warning System (LDWS).

The driving assistance information may include at least one of lane departure information indicating occurrence or non-occurrence of lane departure, information about a distance between the preceding object present in a forward region of the vehicle 100 and the vehicle 100, and information about the possibility of collision with the preceding object, without being limited thereto.

The controller 230 of the vehicle 100 may control the display 260 or the speaker 250 to output such driving assistance information (750).

In more detail, the speaker 250 may output driving assistance information according to a control signal of the controller 230. In more detail, the speaker 250 may output a warning sound or warning message indicating a lane departure of the vehicle 100 based on lane departure information indicating occurrence or non-occurrence of such lane departure of the vehicle 100. The speaker 250 may output a message indicating distance information based on a distance between the preceding object and the vehicle 100, and may output a warning sound or warning message indicating the high possibility of collision with the preceding object based on information about the possibility of collision with the preceding object.

The display 260 may output driving assistance information according to a control signal of the controller 230. In more detail, the display 260 may display not only a warning message which informs the driver of a lane departure based on lane departure information indicating whether there occurs a lane departure of the vehicle 100, but also a message indicating distance information based on a distance between the preceding object and the vehicle 100. In addition, the display 260 may further display a warning message indicating the high possibility of collision with the preceding object based on information about whether there is a high possibility of collision between the vehicle 100 and the preceding object.

The above-mentioned embodiments may be implemented in the form of a recording medium storing commands capable of being executed by a computer system. The commands may be stored in the form of program code. When the commands are executed by the processor, a program module is generated by the commands so that the operations of the disclosed embodiments may be carried out. The recording medium may be implemented as a computer-readable recording medium.

The computer-readable recording medium includes all kinds of recording media storing data readable by a computer system. Examples of the computer-readable recording medium include a Read Only Memory (ROM), a Random Access Memory (RAM), a magnetic tape, a magnetic disk, a flash memory, an optical data storage device, etc.

As is apparent from the above description, a vehicle and a method for controlling the same according to the embodiments of the present disclosure may coordinate a region of interest (ROI), that is initially determined in a forward-view image, based on at least one of braking information and steering information of the vehicle, may establish an effective ROI, and may reduce a consumption time needed to process the ROI image.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
an image acquisition part configured to acquire a forward-view image by capturing an image about a forward region of a vehicle;
a steering information acquisition part configured to acquire steering information by detecting a steering direction and a steering angle of the vehicle;
a braking information acquisition part configured to acquire braking information by detecting a braking or non-braking state and a braking deceleration of the vehicle; and
a controller configured to determine a region of interest (ROI) within the forward-view image based on at least one of the steering information or the braking information of the vehicle,
wherein the controller moves a boundary of the ROI in a direction opposite to the steering direction of the vehicle in the same direction as the steering direction of the vehicle based on the steering information, and thus reduces a size of the ROI.

2. The vehicle according to claim 1, wherein the controller initially determines a predetermined region centering around a center point of the forward-view image within the forward-view image to be the ROI, and coordinates the ROI based on at least one of the steering information and the braking information.

3. The vehicle according to claim 1, wherein the controller moves a position of the ROI in the same direction as the steering direction of the vehicle based on the steering information.

4. The vehicle according to claim 1, wherein the controller moves a position of the ROI in proportion to the steering angle of the vehicle based on the steering information.

5. The vehicle according to claim 1, wherein the controller moves a boundary of the ROI in a direction opposite to the steering direction of the vehicle in the same direction as the steering direction of the vehicle in proportion to the steering angle of the vehicle based on the steering information, and thus reduces a size of the ROI.

6. The vehicle according to claim 1, wherein the controller moves a position of the ROI in an upward direction from a center point of the forward-view image based on the braking information.

7. The vehicle according to claim 1, wherein the controller moves a position of the ROI in an upward direction from a center point of the forward-view image in proportion to a braking deceleration of the vehicle based on the braking information.

8. The vehicle according to claim 1, wherein the controller acquires driving assistance information from an image of the ROI.

9. The vehicle according to claim 8, wherein the driving assistance information is at least one of lane departure information, information about a distance between the vehicle and an object, and information about whether there is a high possibility of collision between the vehicle and the object.

10. A method for controlling a vehicle comprising:
    acquiring a forward-view image by capturing an image about a forward region of a vehicle;
    acquiring steering information by detecting a steering direction and a steering angle of the vehicle;
    acquiring braking information by detecting a braking or non-braking state and a braking deceleration of the vehicle; and
    determining a region of interest (ROI) within the forward-view image based on at least one of the steering information or the braking information of the vehicle,
    wherein the determining a region of interest (ROI) includes:
    moving a boundary of the ROI in a direction opposite to the steering direction of the vehicle in the same direction as the steering direction of the vehicle, and thus reducing a size of the ROI.

11. The method according to claim 10, wherein the determining a region of interest (ROI) includes:
    initially determining a predetermined region centering around a center point of the forward-view image within the forward-view image to be the ROI; and
    coordinating the ROI based on the at least one of the steering information or the braking information.

12. The method according to claim 10, wherein the determining a region of interest (ROI) includes:
    moving a position of the ROI in the same direction as the steering direction of the vehicle based on the steering information.

13. The method according to claim 10, wherein the determining a region of interest (ROI) includes:
    moving a position of the ROI in proportion to the steering angle of the vehicle based on the steering information.

14. The method according to claim 10, wherein the determining a region of interest (ROI) includes:
    moving a boundary of the ROI in a direction opposite to the steering direction of the vehicle in the same direction as the steering direction of the vehicle in proportion to the steering angle of the vehicle based on the steering information, and thus reducing a size of the ROI.

15. The method according to claim 14, wherein the determining a region of interest (ROI) includes:
    moving a position of the ROI in an upward direction from the center point of the forward-view image in proportion to a braking deceleration of the vehicle based on the braking information.

16. The method according to claim 10, wherein the determining a region of interest (ROI) includes:
    moving a position of the ROI in an upward direction from the center point of the forward-view image based on the braking information.

17. The method according to claim 10, further comprising:
    acquiring driving assistance information from an image of the ROI.

18. The method according to claim 17, wherein the driving assistance information is at least one of lane departure information, information about a distance between the vehicle and an object, and information about whether there is a high possibility of collision between the vehicle and the object.

* * * * *